US012603060B2

(12) United States Patent
Park

(10) Patent No.: US 12,603,060 B2
(45) Date of Patent: Apr. 14, 2026

(54) DISPLAY DEVICE

(71) Applicant: LG Display Co., Ltd., Seoul (KR)

(72) Inventor: Mangyu Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 9 days.

(21) Appl. No.: 18/967,304

(22) Filed: Dec. 3, 2024

(65) Prior Publication Data

US 2025/0218405 A1 Jul. 3, 2025

(30) Foreign Application Priority Data

Dec. 28, 2023 (KR) ........................ 10-2023-0195426

(51) Int. Cl.
*G06F 3/038* (2013.01)
*G09G 3/20* (2006.01)
*G09G 3/3291* (2016.01)
*G09G 3/3233* (2016.01)

(52) U.S. Cl.
CPC ......... *G09G 3/3291* (2013.01); *G09G 3/2092* (2013.01); *G09G 3/3233* (2013.01); *G09G 2300/0842* (2013.01); *G09G 2310/0289* (2013.01); *G09G 2310/08* (2013.01); *G09G 2320/043* (2013.01)

(58) Field of Classification Search
CPC ... G09G 3/3291; G09G 3/2092; G09G 3/3233
USPC .......................................................... 345/214
See application file for complete search history.

(56) References Cited

U.S. PATENT DOCUMENTS

2021/0027707 A1* 1/2021 Park ........................ G09G 3/035
2023/0024342 A1* 1/2023 Hsieh .................... G09G 3/3291
2024/0395217 A1* 11/2024 Lee ...................... G09G 3/3233

FOREIGN PATENT DOCUMENTS

KR 10-2017-0087409 A 7/2017
KR 10-2018-0014388 A 2/2018

* cited by examiner

*Primary Examiner* — Jonathan M Blancha
(74) *Attorney, Agent, or Firm* — Fenwick & West LLP

(57) ABSTRACT

The present disclosure relates to a display device, and more specifically, to a display device for controlling outputs by arranging a masking switch or an XOR gate between a level shifter and a switch array of a data driver. The display device presented herein minimizes or at least reduces the degradation of image quality by controlling the output of the data driver under a specific condition.

14 Claims, 21 Drawing Sheets

FIG. 21

| Q | QB | XOR | ST1/ST2 |
|---|---|---|---|
| 0 | 0 | 0 | OFF |
| 0 | 1 | 1 | ON |
| 1 | 0 | 1 | ON |
| 1 | 1 | 0 | OFF |

DISPLAY DEVICE

CROSS REFERENCE TO RELATED APPLICATION

The present application claims priority to Republic of Korea Patent Application No. 10-2023-0195426, filed on Dec. 28, 2023, the disclosure of which is incorporated herein by reference in its entirety.

BACKGROUND

Field

The present disclosure relates to a display device, and more specifically, to a display device in which the degradation of image quality is minimized by controlling an output of a data driver.

Description of the Related Art

Recently, as the information age enters, a display field in which electrical information signals are visually expressed has developed rapidly, and in response thereto, various display devices having excellent performance, such as thinness, lightness, and low power consumption, are being developed.

Examples of display devices may include a liquid crystal display (LCD) device, an organic light emitting diode (OLED) display device, a quantum dot display device, etc.

Such a display device uses a timing controller and a data driver for driving.

SUMMARY

The present disclosure is directed to providing a display device in which the degradation of image quality is minimized or at least reduced by controlling an output of a data driver for driving the display device.

A display device according to one embodiment may include a timing controller configured to output image data, a display panel including a plurality of pixels and a plurality of data lines connected to the plurality of pixels, and a data driver configured to generate a data voltage based on the image data and apply the data voltage to a data line of the plurality of data lines, wherein the data driver includes a level shifter configured to receive the image data, a switch array configured to generate the data voltage from the image data, a masking switch between the level shifter and the switch array, and an output buffer configured to output the data voltage from the data line.

An output of the output buffer may be stopped when the masking switch is turned off.

The masking switch may be connected to each of a plurality of level shifters.

The masking switch may be connected to an uppermost level shifter among a plurality of level shifters.

The data driver may further include a delay unit connected to a control node of the masking switch.

The delay unit may include a plurality of buffers.

The delay unit may operate asynchronously.

The delay unit may include a plurality of flip-flops.

The delay unit may operate synchronously, and the delay unit includes one clock.

The data driver may further include a latch configured to maintain the image data as per-frame image data on at least one channel unit basis and provide the image data to the level shifter.

The latch may operate in synchronization with a latch start pulse for controlling a start time point at which the data voltage is supplied to the level shifter.

The data driver may further include a delay unit connected to a control node of the masking switch.

The latch start pulse may be supplied to an input of the delay unit.

The display device may further include a gamma driver configured to generate gamma reference voltages based on a gamma control signal generated by the timing controller, and the data driver may further include a plurality of resistor strings configured to output a plurality of analog voltages to the level shifter based on the gamma reference voltages.

A display device according to one embodiment may include a timing controller configured to output image data, a display panel including a plurality of pixels and a plurality of data lines are connected to the plurality of pixels, and a data driver configured to generate a data voltage based on the image data and apply the data voltage to a data line of the plurality of data lines, wherein the data driver may include a level shifter configured to receive the image data, a switch array configured to generate the data voltage from the image data, an XOR gate between the level shifter and the switch array, and an output buffer configured to output the data voltage from the data line.

The XOR gate may be connected to each of a plurality of level shifters.

The XOR gate may be connected to an uppermost level shifter among a plurality of level shifters.

The data driver may further include a latch configured to maintain the image data as per-frame image data on at least one channel unit basis and provide the image data to the level shifter.

The latch may operate in synchronization with a latch start pulse for controlling a start time point at which the data voltage is supplied to the level shifter.

The display device may further include a gamma driver configured to generate gamma reference voltages based on a gamma control signal generated by the timing controller, and the data driver may further include a plurality of resistor strings configured to output a plurality of analog voltages to the level shifter based on the gamma reference voltages.

BRIEF DESCRIPTION OF THE DRAWINGS

FIG. 21 is a view showing turn-on or turn-off operations of the first masking transistor and the second masking transistor according to an operation of the XOR gate according to one or more embodiments of the present disclosure.

DETAILED DESCRIPTION

Figure 1:
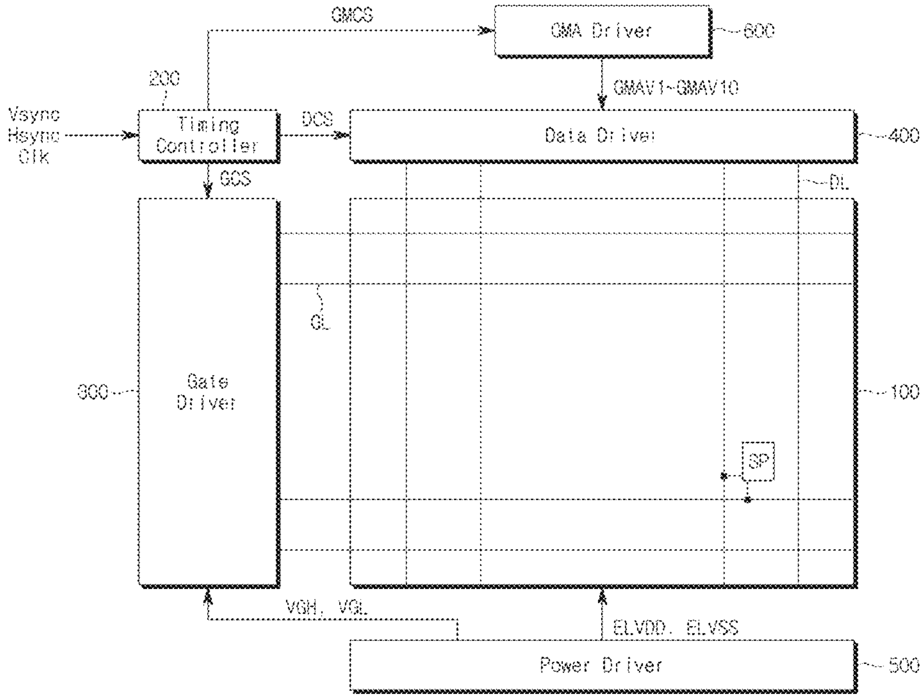
FIG. 1 is a block diagram showing a display device according to one or more embodiments of the present disclosure.

Advantages and features of the present disclosure and methods of achieving them will become clear with reference to embodiments described below in detail in conjunction with the accompanying drawings. The present disclosure is not limited to the embodiments disclosed below but can be implemented in various different forms, these embodiments are merely provided to make the disclosure of the present disclosure complete and fully inform those skilled in the art to which the present disclosure pertains of the scope of the present disclosure, and the present disclosure is only defined by the scope of the appended claims.

Since shapes, sizes, ratios, angles, numbers, and the like disclosed in the drawings for describing the embodiments of the present disclosure are illustrative, the present disclosure is not limited to the shown items. The same reference number indicates the same components throughout the specification. In addition, in describing the present disclosure, when it is determined that the detailed description of a related known technology may unnecessarily obscure the gist of the present disclosure, detailed description thereof will be omitted.

When the terms “comprise,” “include,” and “have” described in the present specification are used, other parts may be added unless “only” is used. When a component is expressed in the singular, it can be construed as a plurality of components unless specifically stated otherwise.

In construing a component, the component is construed as including the margin of error even when there is no separate explicit description.

When the positional relationship is described, for example, when the positional relationship between two components is described using the term “on,” “above,” “under,” “next to,” or the like, one or more other components may be positioned between the components unless the term “immediately” or “directly” is used.

Although the term “first,” “second,” or the like may be used to distinguish components, functions or structures of the components are not limited by the ordinal number or component name added to the front of the component.

The following embodiments may be partially or fully coupled or combined, and various technological interworking and driving are possible. The embodiments may be implemented independently of each other and implemented together in the associated relationship.

A driving circuit of a display device writes pixel data of input images into pixels. A driving circuit of a flat panel display device includes a data driver for supplying data signals to data lines, a gate driver for supplying gate signals to gate lines, etc.

In the display device according to the present disclosure, each of a pixel circuit and a gate driver may include a plurality of transistors and may be formed directly on a substrate of a display panel. The transistor may be implemented as a thin film transistor (TFT) having a metal-oxide-semiconductor field effect transistor (MOSFET) structure and may be an oxide TFT containing an oxide semiconductor or a low temperature polysilicon (LTPS) TFT containing LTPS.

A transistor is a three-electrode element including a gate, a source, and a drain. The source is an electrode for supplying carriers to the transistor. The carriers start to flow from the source in the transistor. The drain is an electrode through which the carriers move from the transistor to the outside. In the transistor, flows of the carriers flow from the source to the drain. In the case of an n-channel transistor, since the carriers are electrons, a source voltage has a lower voltage than a drain voltage so that the electrons may flow from the source to the drain. In the n-channel transistor, a direction of the current flows from the drain to the source. In the case of a p-channel transistor, since the carriers are holes, the source voltage is higher than the drain voltage so that the holes may flow from the source to the drain. In the p-channel transistor, a current flows from the source to the drain because the holes flow from the source to the drain. It should be noted that the source and drain of the transistor are not fixed. For example, the source and the drain may be changed depending on an applied voltage. Therefore, the disclosure is not limited by the source and drain of the transistor. In the following description, the source and drain of the transistor are referred to as “first and second electrodes.”

A gate signal may swing between a gate-on voltage and a gate-off voltage. The gate-on voltage is set to a voltage higher than a threshold voltage of the transistor. The gate-off voltage is set to a voltage lower than the threshold voltage of the transistor.

The transistor is turned on in response to the gate-on voltage, while the transistor is turned off in response to the gate-off voltage. In the case of the n-channel transistor, the gate-on voltage may be a gate high voltage VGH or VEH, and the gate-off voltage may be a gate low voltage VGL or VEL. In the case of the p-channel transistor, the gate-on voltage may be the gate low voltage VGL or VEL, and the gate-off voltage may be the gate high voltage VGH or VEH. In the following embodiments, although an example in which transistors of a pixel circuit are implemented as p-channel transistors will be mainly described, it should be noted that the present disclosure is not limited thereto.

Hereinafter, various embodiments of the present disclosure will be described in detail with reference to the accompanying drawings. In the following embodiments, although an example in which the display device is an OLED display device, the present disclosure is not limited thereto.

FIG. 1 is a block diagram showing a display device according to one or more embodiments of the present disclosure.

Referring to FIG. 1, a display device according to various embodiments of the present disclosure may include a display panel 100, a timing controller 200, a gate driver 300, a data driver 400, a power driver 500, and a gamma driver.

The display panel 100 includes a pixel array in which input images are displayed on a screen. The pixel array includes a plurality of data lines DL, a plurality of gate lines GL intersecting the data lines DL, and sub-pixels SP disposed in a matrix form.

The display panel 100 may be implemented as a non-transmissive display panel or a transmissive display panel. The display panel 100 may be manufactured as a flexible display panel. The flexible display panel may be implemented as an OLED panel using a plastic substrate.

The timing controller 200 receives timing signals from a set system (or a host system). The timing signals may include a vertical synchronization signal Vsync, a horizontal synchronization signal Hsync, a clock Clk, etc. Set systems include a TV, a monitor, a set-top box, a navigation system, a personal computer, a home theater system, a mobile device, a wearable device, a vehicle system, etc.

The timing controller 200 may control an operation timing of the display panel 100 according to an input frequency (or a driving frequency). The input frequency may be 60 Hz in a national television standards committee (NTSC) format. Recently, display devices driven at a higher frequency of 120 Hz have become popular. In addition, the display device driven at 120 Hz may be controlled to be temporarily driven at 60 Hz in some cases. In addition, recently, display devices that support a variable refresh rate (VRR) at which the display device is operated by decreasing a frame frequency to a frequency between 1 Hz and 30 Hz in a low-speed driving mode and increasing the frame frequency to 144 Hz in the case of high-resolution images (e.g., a gaming mode) have been developed.

The timing controller 200 may output a data control signal DCS for controlling the data driver 400, a gate control signal GCS for controlling the gate driver 300, and a gamma control signal GMCS for driving the gamma driver 600 based on the received timing signals Vsync, Hsync, and Clk.

The gate driver 300 may be implemented as a gate in panel (GIP) circuit formed directly on the display panel 100 together with the TFT array and wires of the pixel array. The gate driver 300 sequentially outputs the gate signals to the gate lines GL under the control of the timing controller 200. The gate driver 300 may sequentially output the signals to the plurality of gate lines GL by shifting the gate signals using a shift register unit (not shown).

The data driver 400 converts pixel data of the input images received as digital signals from the timing controller 200 every frame period using gamma reference voltages GMAV1 to GMAV10 provided from a digital-to-analog converter DAC and the gamma driver 600 into gamma compensation voltages and outputs data voltages. The data driver 400 may be implemented as a plurality of source drive integrated circuits. The data driver 400 may be electrically connected to the data lines DL of the display panel 100 through a chip on glass (COG) process or a tape automated bonding (TAB) process.

The power driver 500 may output DC powers required to drive the pixel array of the display panel 100 and the drivers 300, 400, and 600 using a DC-DC converter. The power driver 500 may receive DC input voltages applied from the set system or the host system and output DC voltages such as a gate high voltage VGH, a gate low voltage VGL, a high potential power voltage ELVDD, a low potential power voltage ELVSS, and a high potential reference voltage (not shown).

Specifically, the gate high voltage VGH is a voltage set to threshold voltages or more of transistors formed in an array of sub-pixels SP. The gate high voltage VGH may be output to the gate driver 300 and supplied to the level shifter in the gate driver 300.

The gate low voltage VGL is a voltage lower than the threshold voltages of the transistors formed in the array of the sub-pixels SP. The gate low voltage VGL may be supplied to the level shifter in the gate driver 300.

The high potential power voltage ELVDD is a voltage supplied to an anode of a light emitting element and is a positive voltage at which the light emitting element is driven. The high potential power voltage ELVDD may be supplied to a high potential power voltage line connected to each sub-pixel SP in the display panel 100.

The low potential power voltage ELVSS is a voltage supplied to a cathode of a light emitting element and is a negative voltage at which the light emitting element is driven. The low potential power voltage ELVSS may be supplied to a low potential power voltage line connected to each sub-pixel SP in the display panel 100.

The gamma driver 600 receives a high potential reference voltage (not shown) output from the power driver 500. The gamma driver 600 receives the gamma control signal GMCS from the timing controller 200. The gamma driver 600 generates the gamma reference voltages GMAV1 to GMAV10 having values between the high potential reference voltage VDD and the ground voltage 0 V in response to the gamma control signal GMCS, and the data driver 400 outputs data voltages based on the gamma reference voltages GMAV1 to GMAV10 and adjusts luminance.

Figure 2:
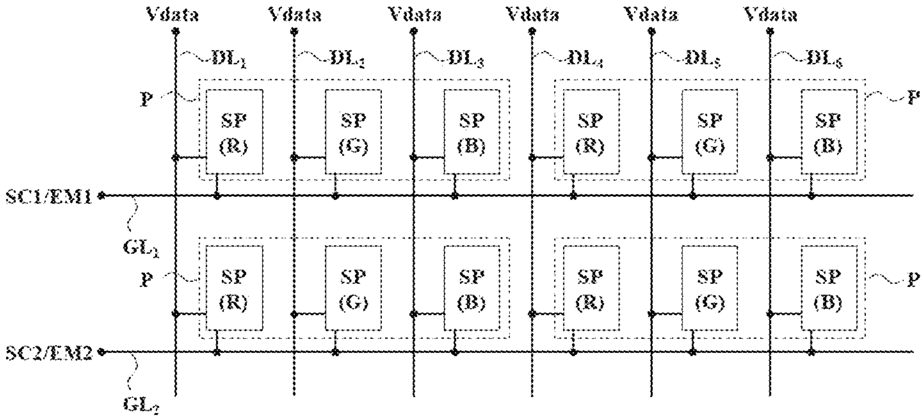
FIG. 2 is a view showing pixels and sub-pixels according to one or more embodiments of the present disclosure.

FIG. 2 is a view showing pixels and sub-pixels according to one or more embodiments of the present disclosure.

The pixel may have the arrangement shown in FIG. 2. Referring to FIG. 2, each pixel P may include a plurality of sub-pixels SP. The sub-pixels SP may include a red sub-pixel SP(R), a green sub-pixel SP(G), and a blue sub-pixel SP(B). In some cases, the pixel P may further include a white sub-pixel (not shown). Each of data lines DL1 to DL6 may transmit data voltages Vdata for displaying images to the sub-pixels SP. Scan signals $SC_1$ and $SC_2$ for turning on and off the transistors or emission signals $EM_1$ and $EM_2$ for controlling light emission may be applied to each of the gate lines $GL_1$ and $GL_2$.

Figure 3:
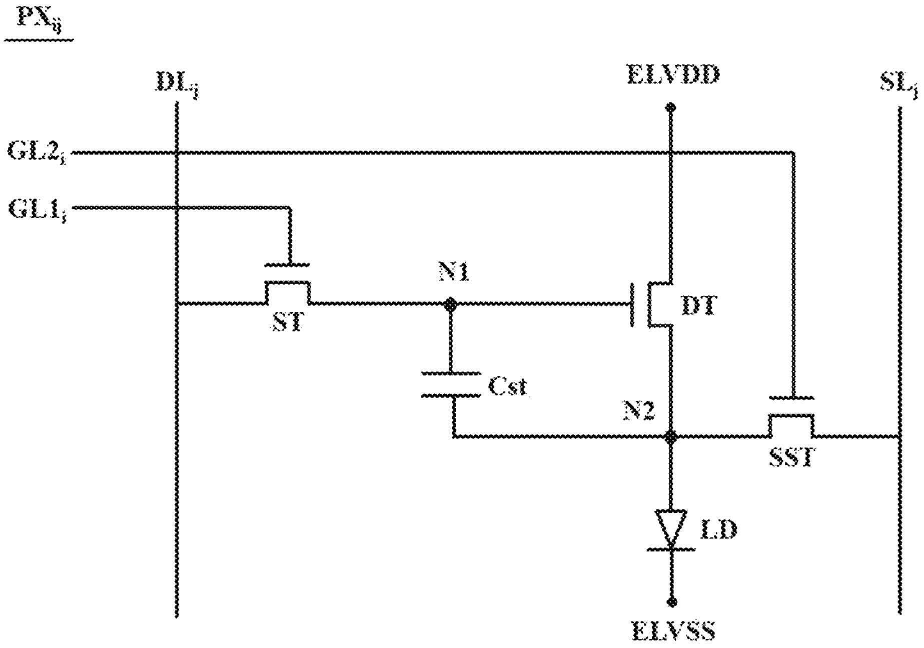
FIG. 3 is a circuit diagram showing a circuit of the sub-pixel according to one or more embodiments of the present disclosure.

FIG. 3 is a circuit diagram showing a circuit of the sub-pixel according to one or more embodiments of the present disclosure.

Referring to FIG. 3, a pixel $PX_{ij}$ may include a switching transistor ST, a driving transistor DT, a sensing transistor SST, a storage capacitor Cst, and a light emitting element LD.

A first electrode (e.g., a source electrode) of the switching transistor ST may be electrically connected to a $j^{th}$ data line $DL_j$, and a second electrode (e.g., a drain electrode) thereof may be electrically connected to a first node N1 thereof. A gate electrode of the switching transistor ST may be electrically connected to an $i^{th}$ first gate line $GL\mathbf{1}_i$. The switching transistor ST may be turned on when a gate signal at a gate-on level is applied to the $i^{th}$ first gate line $GL\mathbf{1}_i$ to transmit a data signal applied to the $j^{th}$ data line $DL_j$ to the first node N1.

A first electrode of the storage capacitor Cst may be electrically connected to the first node N1, and a second electrode thereof may be connected to a first electrode of the light emitting element LD. The storage capacitor Cst may be charged to a voltage corresponding to a difference between a voltage applied to the first node N1 and a voltage applied to the first electrode of the light emitting element LD.

A first electrode (e.g., a source electrode) of the driving transistor DT may be configured to receive the high potential driving voltage ELVDD, and a second electrode (e.g., a drain electrode) may be electrically connected to the first electrode (e.g., a cathode electrode) of the light emitting element LD. A gate electrode of the driving transistor DT may be electrically connected to the first node N1. The driving transistor DT may be turned on when a voltage at a gate-on level is applied through the first node N1, and may control the amount of a driving current flowing through the light emitting element LD in response to the voltage provided to the gate electrode.

A first electrode (e.g., a source electrode) of the sensing transistor SST may be electrically connected to a $j^{th}$ sensing line $SL_j$, and a second electrode (e.g., a drain electrode) may be electrically connected to the first electrode (e.g., the anode electrode) of the light emitting element LD. A gate electrode of the sensing transistor SST may be electrically connected to an $i^{th}$ second gate line $GL\mathbf{2}_i$. The sensing transistor SST may be turned on when a sensing signal at the gate-on level is applied to the $i^{th}$ second gate line $GL\mathbf{2}_i$ to transmit a reference voltage applied to the $j^{th}$ sensing line $SL_j$ to the first electrode of the light emitting element LD.

The light emitting element LD may emit light corresponding to the driving current. The light emitting element LD may output light corresponding to any one of red, green, blue, and white. The light emitting element LD may be an OLED or an ultra-small inorganic light emitting element having the size ranging from micro to nano scale, but the present embodiment is not limited thereto. Hereinafter, the technical spirit of the present embodiment will be described with reference to an embodiment in which the light emitting element LD is configured as the OLED.

In the present embodiment, a structure of a pixel $PX_{ij}$ is not limited to that shown in FIG. 3. According to the embodiment, the pixels $PX_{ij}$ may further include at least one element for compensating a threshold voltage of the driving transistor DT or initializing a voltage of the gate electrode of the driving transistor DT and/or a voltage of the first electrode of the light emitting element LD. In this case, the sensing transistor SST may be omitted from the pixel $PX_{ij}$.

FIG. 3 shows an example in which the switching transistor ST, the driving transistor DT, and the sensing transistor SST are NMOS transistors according to one or more embodiments of the present disclosure, but the present disclosure is not limited thereto. For example, at least some or all of the transistors forming each pixel PX may be formed as PMOS transistors. In various embodiments, the switching transistor ST, the driving transistor DT, and the sensing transistor SST may each be implemented as an LTPS TFT, an oxide TFT, or a low temperature polycrystalline oxide (LTPO) TFT.

Figure 4:
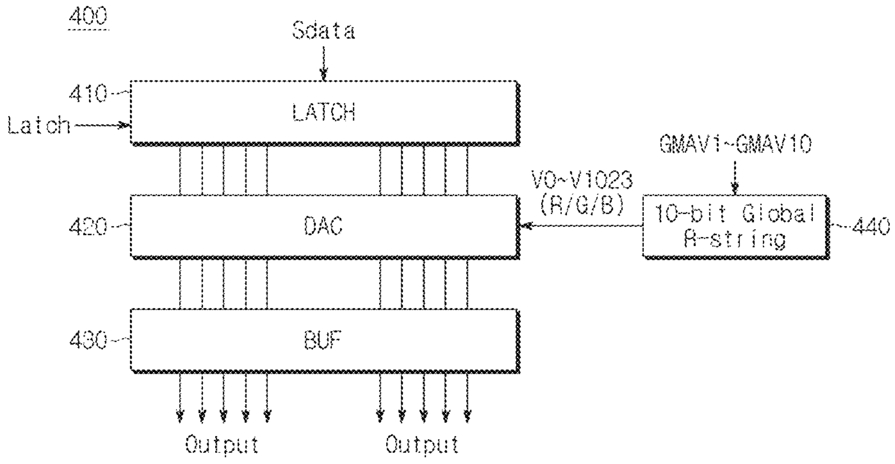
FIG. 4 is a block diagram showing a data driver according to one or more embodiments of the present disclosure.

FIG. 4 is a block diagram showing a data driver according to one or more embodiments of the present disclosure.

Referring to FIG. 4, the data driver 400 includes a latch unit 410, a conversion unit 420, a buffer unit 430, and a voltage divider 440.

The latch unit 410 receives serial video data Sdata as a digital differential signal from the timing controller 200 (see FIG. 1). The serial video data Sdata may be transmitted in the form of a data packet including pixel data of input images, a clock, a source output enable signal, etc. The latch unit 410 samples the serial video data Sdata received from the timing controller according to the clock and converts the sampled serial video data into parallel data. In other words, the latch unit 410 may maintain per-one frame serial video data Sdata received from the timing controller in at least one channel unit basis and output the serial video data as parallel data. The latch unit 410 may include a shift register and a latch start pulse Latch. The latch start pulse Latch may control a start time point at which the parallel data output of the latch unit 410 is supplied to the conversion unit 420. The parallel data output from the latch unit 410 may be data output simultaneously from a plurality of channels.

The conversion unit 420 may be a digital-to-analog converter DAC for converting a digital signal to an analog signal. The conversion unit 420 may convert digital parallel data into analog data using gamma compensation voltages V0 to V1023 for each color that are provided from the voltage divider 440. The conversion unit 420 may include an independent digital-to-analog converter DAC for each color. The conversion unit 420 may include a level shifter 421 (see FIG. 5) and a switch array 422 (see FIG. 5).

The buffer unit 430 outputs the data voltage Vdata to the data line for each channel of the data driver 400 through an output buffer connected to an output node of the conversion unit 420.

Since the light emitting element has a different efficiency for each color, the data voltage Vdata may be set differently for each color to implement ideal optical compensation.

The voltage divider 440 receives the gamma reference voltages GMAV1 to GMAV10 from the gamma driver 600 and outputs the gamma compensation voltages V0 to V1023. The voltage divider 440 divides the gamma reference voltages GMAV1 to GMAV10 using a plurality of resistors connected in series and outputs the gamma compensation voltages V0 to V1023 set for each grayscale 0 G to 1023 G. The gamma compensation voltages V0 to V1023 are voltages optimized for each color according to a preset color gamma curve. To independently generate the gamma compensation voltages for each color, each of the gamma reference voltages GMAV1 to GMAV10 (R/G/B) of each color may include N gamma reference voltages having different voltage levels. For example, N may be 10.

Figure 5:
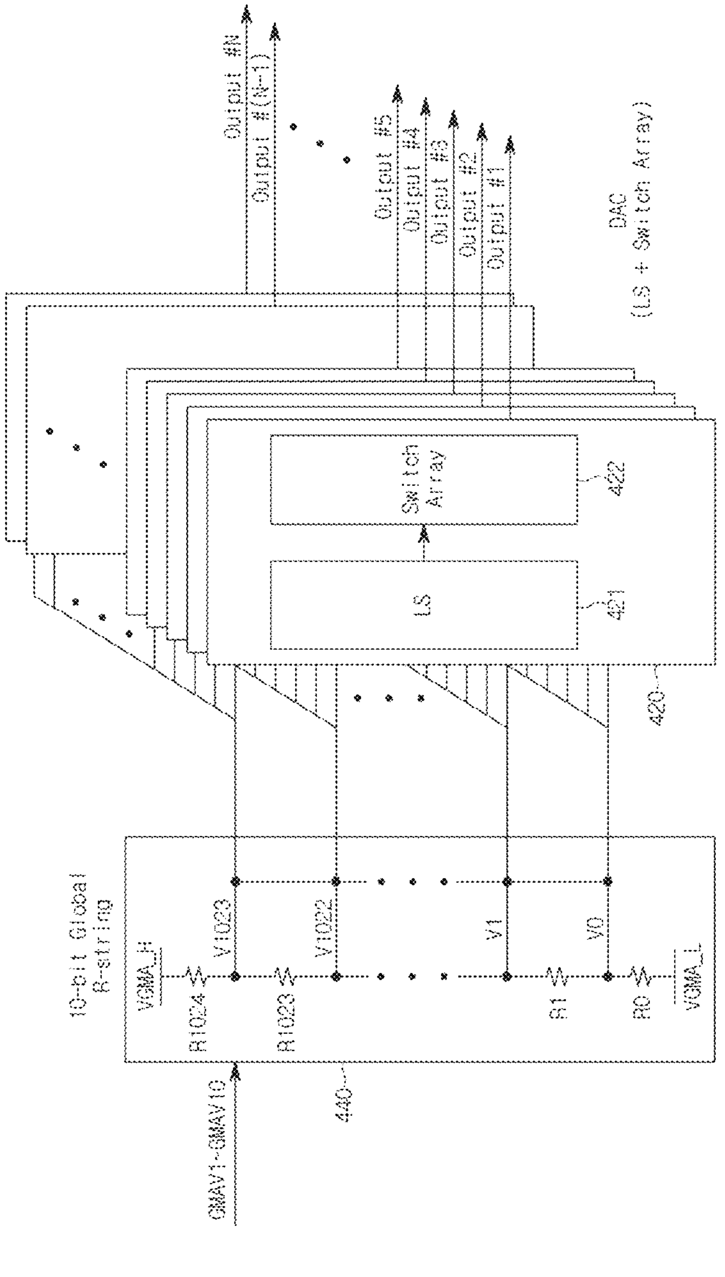
FIG. 5 is a block diagram showing a voltage divider and a converter according to one or more embodiments of the present disclosure.

FIG. 5 is a block diagram showing a voltage divider and a converter according to one or more embodiments of the present disclosure.

Referring to FIG. 5, the voltage divider 440 receives the gamma reference voltages GMAV1 to GMAV10 from the gamma driver 600. The voltage divider 440 outputs the gamma compensation voltages V0 to V1023 using 1025 resistors between a high potential gamma voltage VGMA_H and a low potential gamma voltage VGMA_L. In this case, the gamma reference voltages GMAV1 to GMAV10 serve to prevent noises of the gamma compensation voltages V0 to V1023.

The conversion unit 420 includes the level shifter 421 and the switch array 422. The level shifter 421 selects the gamma compensation voltages V0 to V1023 matching 10-bit image data Sdata from the switch array 422 and outputs the gamma compensation voltages V0 to V1023 to the buffer unit 430.

Hereinafter, in FIG. 6, to describe various embodiments, the conversion unit is described based on the 3-bit global resistor string.

Figure 6:
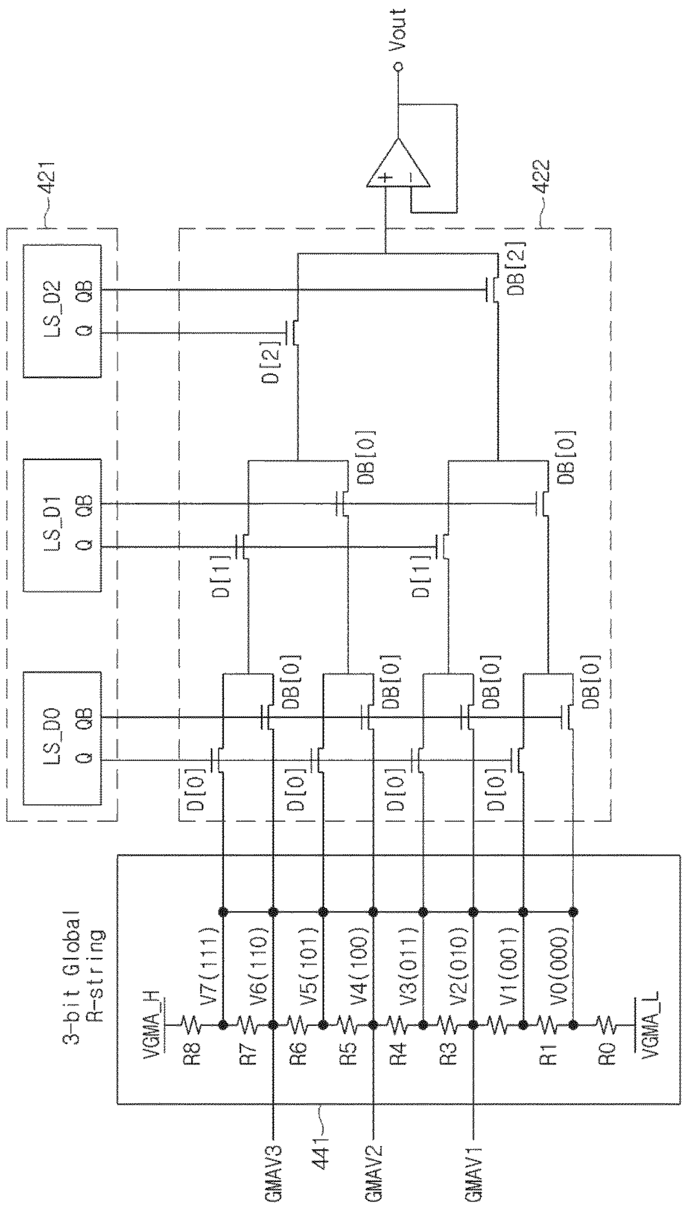
FIG. 6 is a circuit diagram showing that a first gamma reference voltage, a second gamma voltage, and a third gamma voltage are connected by a 3-bit global resistor string in a gamma driver according to one or more embodiments of the present disclosure.

FIG. 6 is a circuit diagram showing that a first gamma reference voltage, a second gamma voltage, and a third gamma voltage are connected by a 3-bit global resistor string in a gamma driver according to one or more embodiments of the present disclosure.

Referring to FIG. 6, the 3-bit global resistor string 441 receives three gamma reference voltages GMAV1 to GMAV3 from the gamma driver 600. The 3-bit global resistor string 441 outputs the gamma compensation voltages V0 to V7 using 9 resistors R0 to R8 between the high potential gamma voltage VGMA_H and the low potential gamma voltage VGMA_L. Among the gamma compensation voltages V0 to V7, the first gamma reference voltage GMAV1, the second gamma reference voltage GMAV2, and the third gamma reference voltage GMAV3 are connected to a node between the second resistor R2 and the third resistor R3, a node between the fourth resistor R4 and a node between the sixth resistor R6 and the seventh resistor R7, respectively, which serves to prevent the noises of the gamma compensation voltages V0 to V7.

The level shifter 421 is composed of 3-bit level shifters LS_D0, LS_D1, and LS_D2 to select switches of the switch array 422 connected to the 3-bit global resistor string 441. In other words, the level shifter 421 outputs a turn-on or turn-off level signal at a first value Q or a second value QB according to a digital value of the 3-bit image data Sdata.

The switch array 422 outputs an analog voltage corresponding to the digital value of the image data Sdata to the buffer unit 430 according to the turn-on or turn-off level signal of the first value Q or the second value QB output from the 3-bit level shifters LS_D0, LS_D1, and LS_D2.

Figure 7:
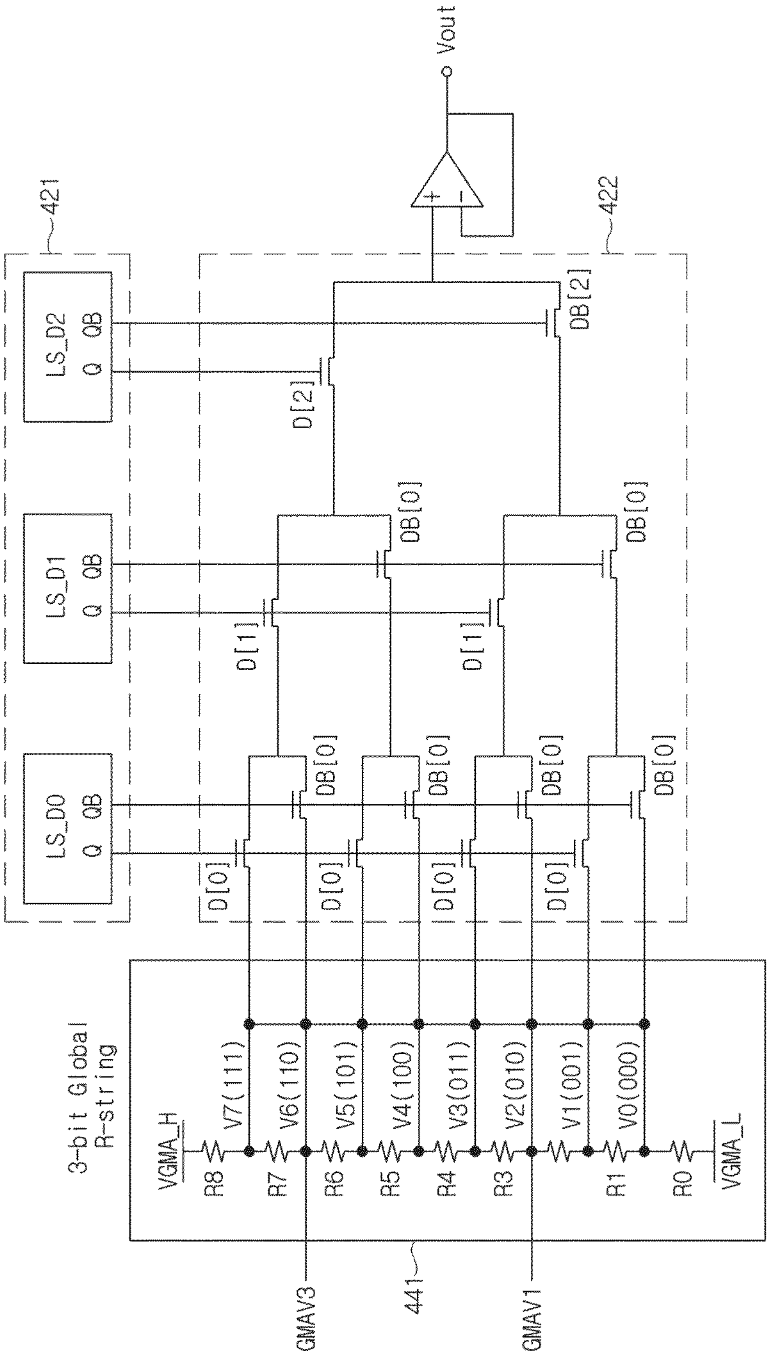
FIG. 7 is a circuit diagram showing that the first gamma reference voltage and the third gamma voltage are connected by the 3-bit global resistor string in the gamma driver according to one or more embodiments of the present disclosure.

FIG. 7 is a circuit diagram showing that the first gamma reference voltage and the third gamma voltage are connected by the 3-bit global resistor string in the gamma driver according to one or more embodiments of the present disclosure.

Referring to FIG. 7, the 3-bit global resistor string 441 receives the first gamma reference voltage GMAV1 and the third gamma reference voltage GMAV3 from the gamma driver 600. In other words, the second gamma reference voltage GMAV2 can be deleted, which is advantageous in hardware overhead and price competitiveness.

Figure 8:
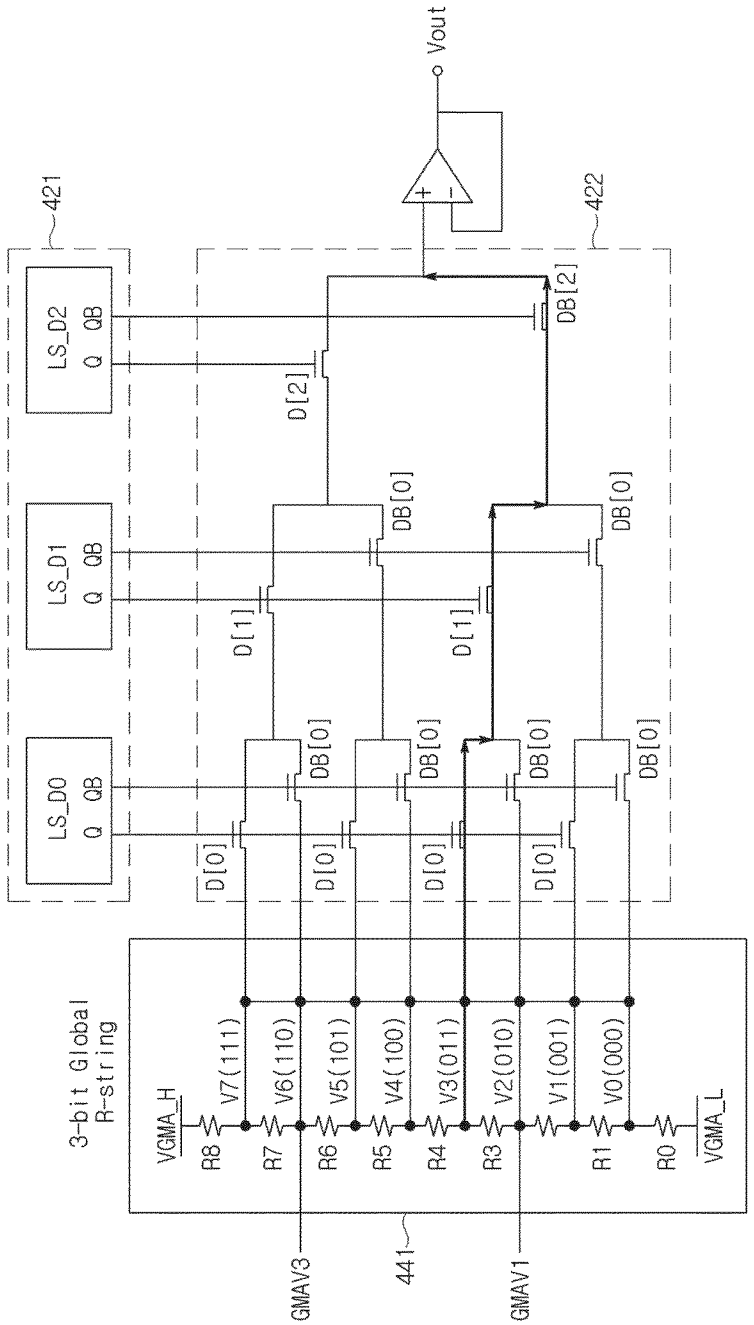
FIGS. 8, 9, and 10 are circuit diagrams showing that a short pass is formed in the 3-bit global resistor string and the switch array according to one or more embodiments of the present disclosure.
Figure 9:
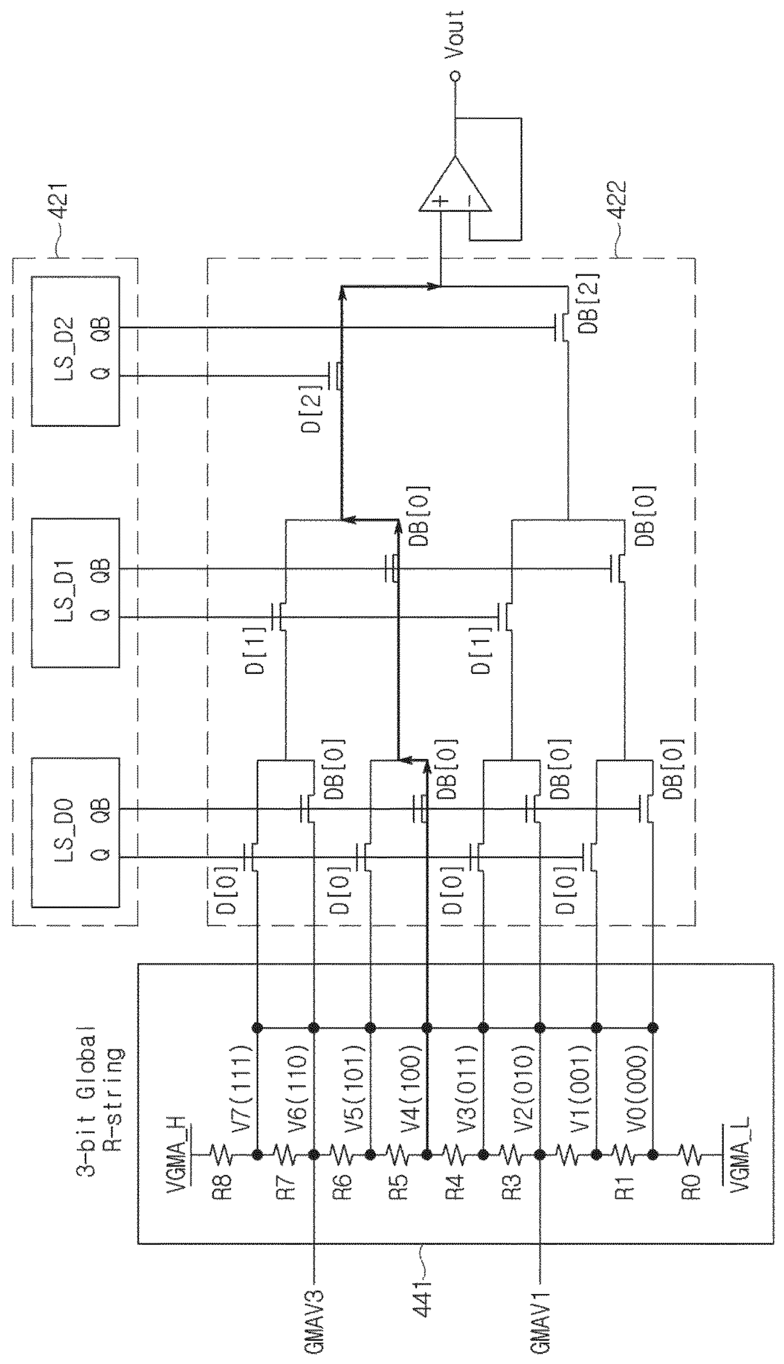
Figure 10:
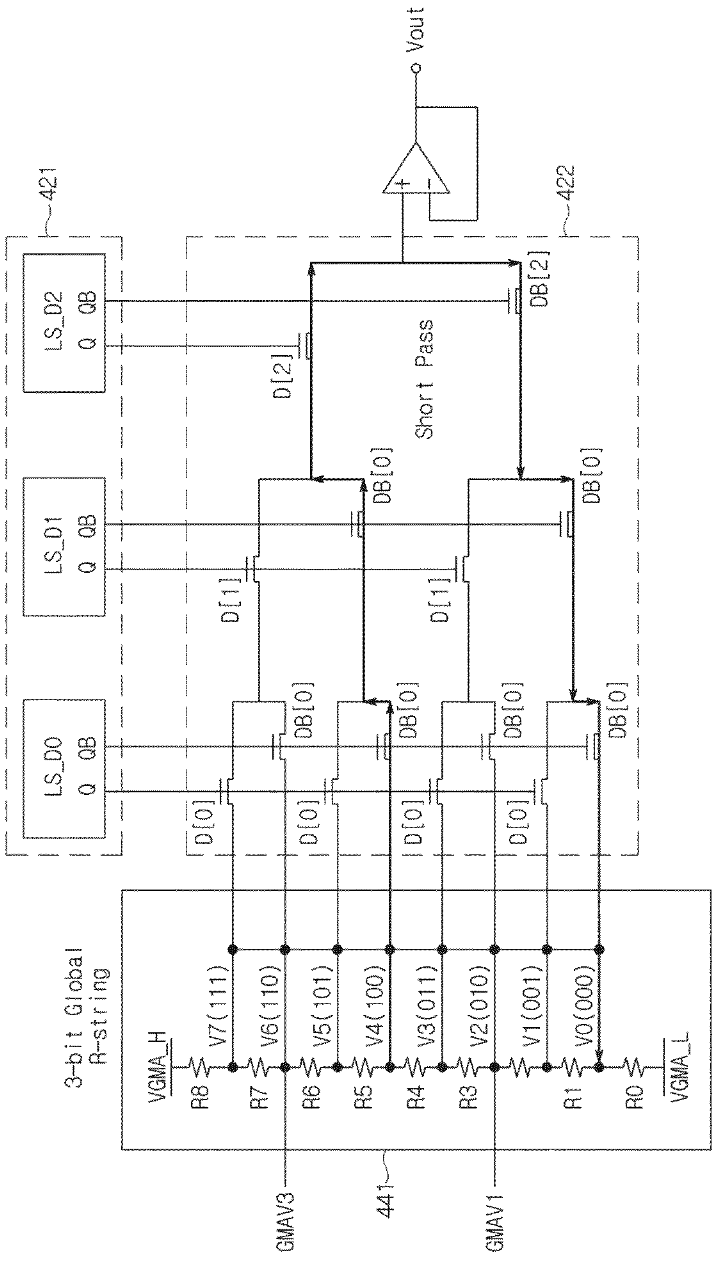

FIGS. 8, 9, and 10 are circuit diagrams showing that current paths are generated in the 3-bit global resistor string and the switch array according to one or more embodiments of the present disclosure.

Referring to FIG. 8, when the 3-bit image data Sdata is V3 (011), a value of the first level shifter LS_D0 is set to 1, a value of the second level shifter LS_D1 is set to 1, and a value of the third level shifter LS_D2 is set to 0. The value of the first level shifter LS_D0 is selected as the first value Q, D[0] is turned on, and DB[0] is turned off. The value of the second level shifter LS_D1 is selected as the first value Q, D[1] is turned on, and DB[1] is turned off. The value of the third level shifter LS_D2 is selected as the second value QB, D[2] is turned off, and DB[2] is turned on.

Referring to FIG. 9, when the 3-bit image data Sdata is V4 (100), the value of the first level shifter LS_D0 is set to 0, the value of the second level shifter LS_D1 is set to 0, and the value of the third level shifter LS_D2 is set to 1. The value of the first level shifter LS_D0 is selected as the second value QB, D[0] is turned off, and DB[0] is turned on. The value of the second level shifter LS_D1 is selected as the second value QB, D[1] is turned off, and DB[1] is turned on. The value of the third level shifter LS_D2 is selected as the first value Q, D[2] is turned on, and DB[2] is turned off.

Referring to FIGS. 8, 9, and 10, when the 3-bit image data Sdata is changed from V3 (011) to V4 (100), the value of the first level shifter LS_D0 is selected as the second value QB, D[0] is turned off, and DB[0] is turned on. In addition, the value of the second level shifter LS_D1 is selected as the second value QB, D[1] is turned off, and DB[1] is turned on. Lastly, the value of the third level shifter LS_D2 is selected as the first value Q, D[2] is turned on, and DB[2] is turned off. However, since the current starting from the 3-bit global resistor string 441 passes through the first level shifter LS_D0, the second level shifter LS_D1, and the third level shifter LS_D2 in order, signals at D[2] and DB[2] controlled by the first value Q and the second value QB of the third level shifter LS_D2 may be delayed. Therefore, when DB[2] may not momentarily be turned off, both D[2] and DB[2] are turned on to form a short pass.

Figure 11:
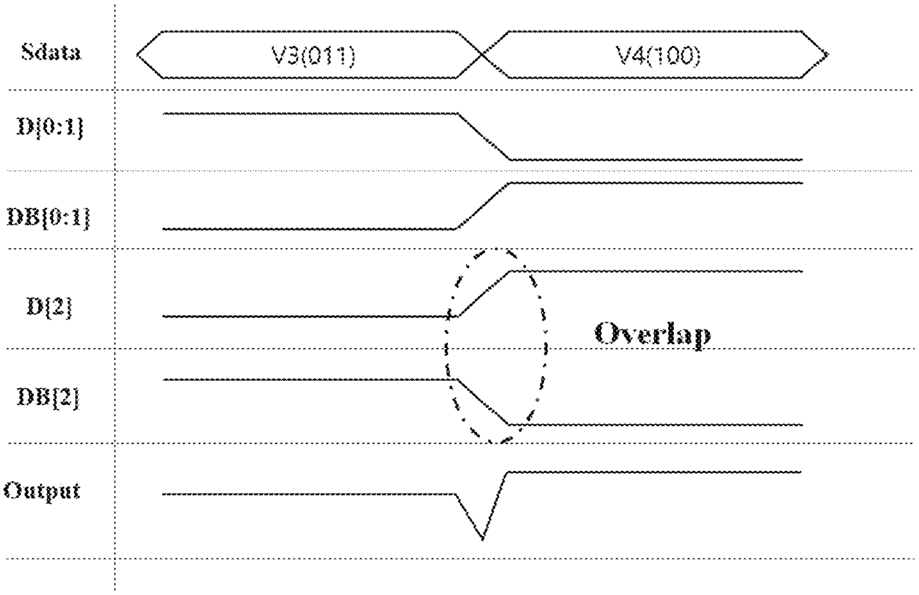
FIG. 11 is a timing diagram showing the occurrence of overlap at D[2] and DB[2] that are the uppermost bits of 3-bit image data according to one or more embodiments of the present disclosure.

FIG. 11 is a timing diagram showing the occurrence of overlap at D[2] and DB[2] that are the uppermost bits of 3-bit image data according to one or more embodiments of the present disclosure.

Referring to FIG. 11, when the 3-bit image data Sdata is changed from V3(011) to V4(100), D[0:1] is changed from high to low, DB[0:1] is changed from low to high, and overlap momentarily occurs at D[2] and DB[2] that are the uppermost bits of the 3-bit image data Vdata, and thus unintended noise may appear in the output.

Figure 12:
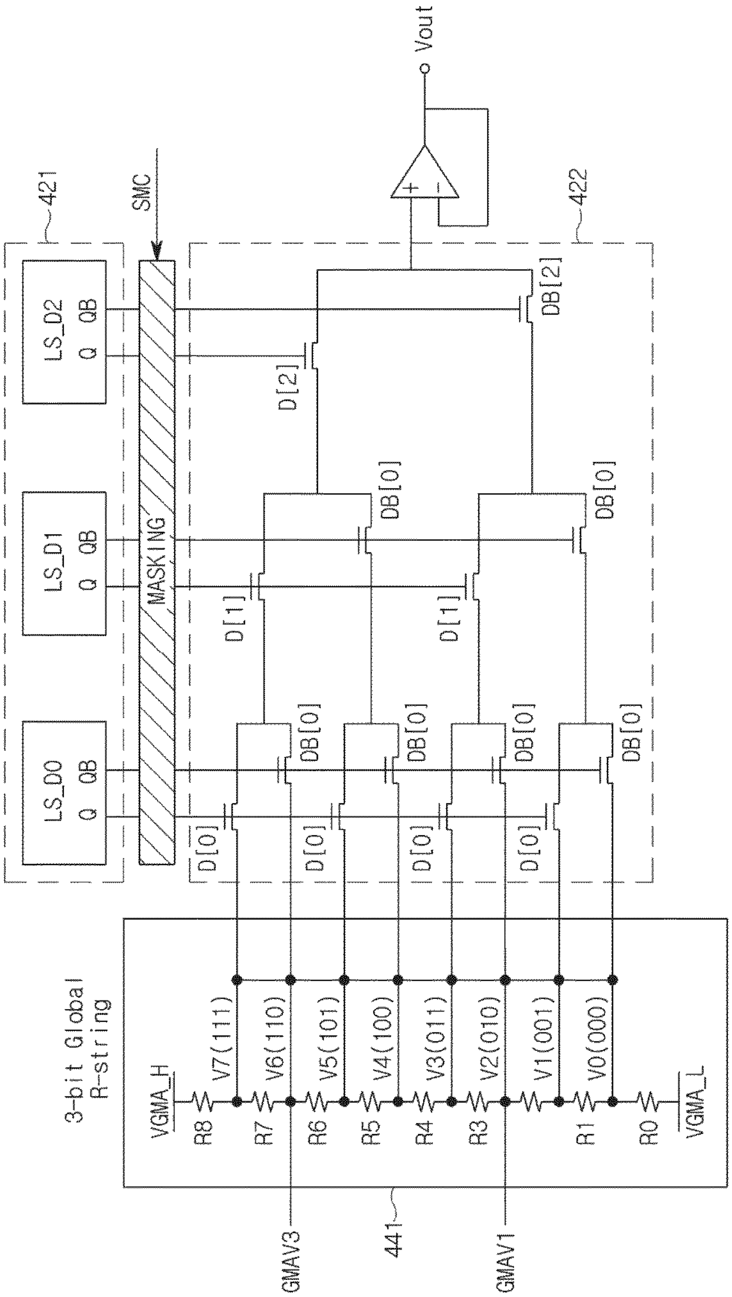
FIG. 12 is a circuit diagram showing masking locations according to one or more embodiments of the present disclosure.

FIG. 12 is a circuit diagram showing masking locations according to one or more embodiments of the present disclosure.

Referring to FIG. 12, when the 3-bit image data Sdata is input, masking may occur at a location where the outputs of the first level shifter LS_D0, the second level shifter LS_D1, and the third level shifter LS_D2 in the level shifter 421 are connected to the switch array 422. A masking control signal SMC for masking may be connected to the timing controller 200, the data driver 400, the latch unit 410, or the delay unit 450, but is not limited thereto.

Figure 13:
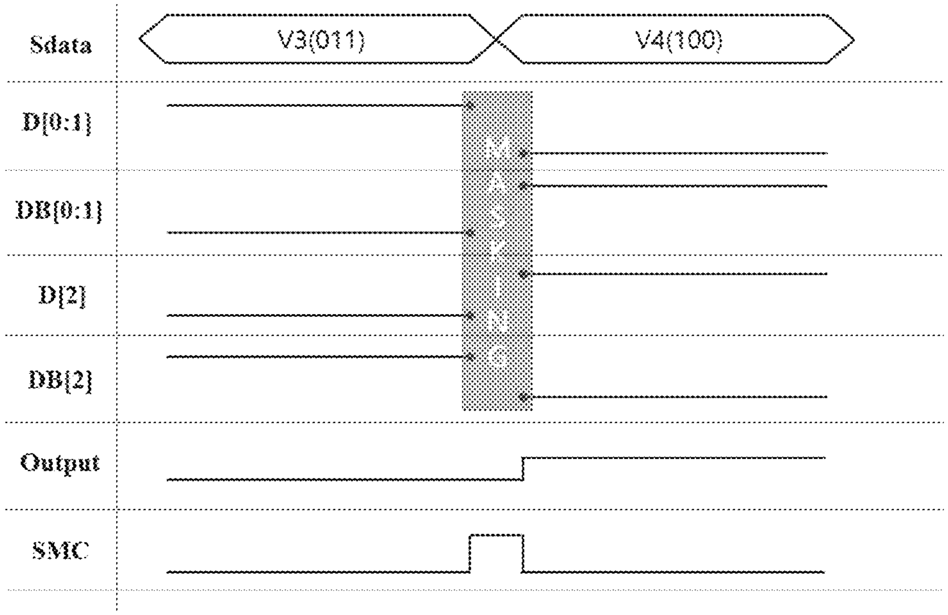
FIG. 13 is a timing diagram showing that the 3-bit image data is masked according to one or more embodiments of the present disclosure.

FIG. 13 is a timing diagram showing that the 3-bit image data according to one or more embodiments of the present disclosure is masked.

Referring to FIG. 13, when the 3-bit image data Sdata is changed from V3 (011) to V4 (100), the outputs are masked at a point where D[0:1] is changed from high to low, a point where DB[0:1] is changed from low to high, and points where D[2] and DB[2] that are the uppermost bits of the 3-bit image data are momentarily changed from high to low or from low to high, and thus the unintended noise does not appear in the outputs. The time point at which the outputs are masked may be a time point at which the masking control signal SMC is turned on.

Figure 14:
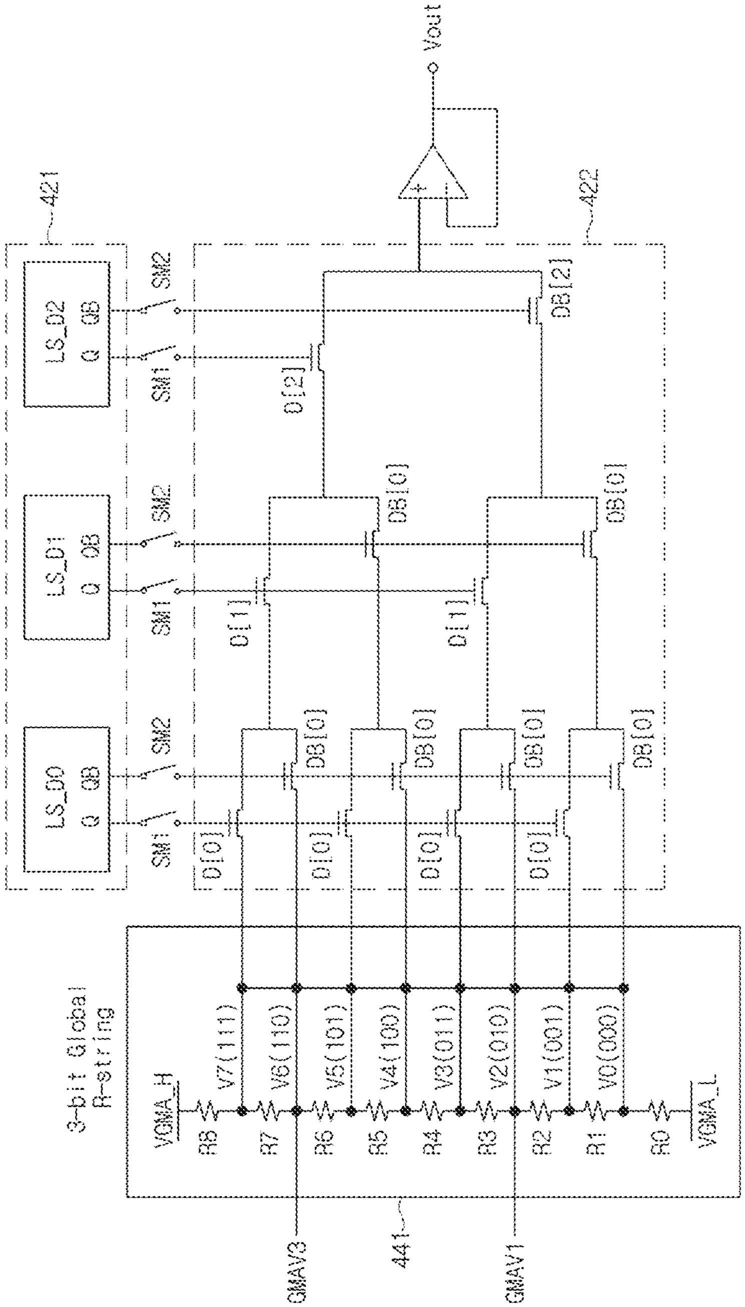
FIG. 14 is a circuit diagram showing that a first masking switch and a second masking switch are connected to all bits of a level shifter according to one or more embodiments of the present disclosure.

FIG. 14 is a circuit diagram showing that a first masking switch and a second masking switch are connected to all bits of a level shifter according to one or more embodiments of the present disclosure.

Referring to FIG. 14, the first values Q and the second values QB of the first level shifter LS_D0, the second level shifter LS_D1, and the third level shifter LS_D2 are each connected to masking switches SM1 and SM2. The masking switch SM1 connected to the first level shifter LS_D0 is connected to D[0], and the masking switch SM2 is connected to DB[0]. The masking switch SM1 connected to the second level shifter LS_D1 is connected to D[1], and the masking switch SM2 is connected to DB[1]. The masking switch SM1 connected to the third level shifter LS_D2 is connected to D[2], and the masking switch SM2 is connected to DB[2].

The first masking switch SM1 and the second masking switch SM2 each connected to the first level shifter LS_D0, the second level shifter LS_D1, and the third level shifter LS_D2 may be simultaneously turned on or turned off to mask the outputs.

Figure 15:
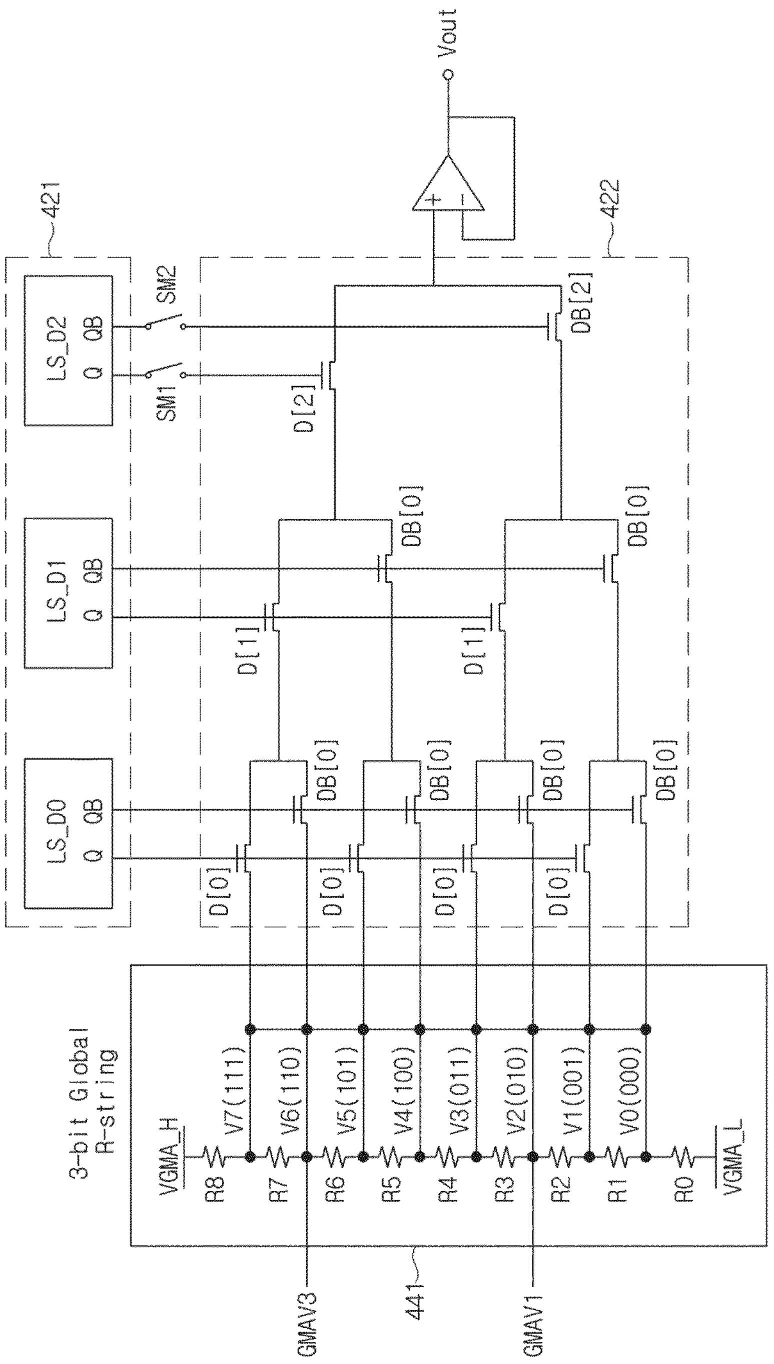
FIG. 15 is a circuit diagram showing that the first masking switch and the second masking switch are connected to the uppermost bits of a level shifter according to one or more embodiments of the present disclosure.

FIG. 15 is a circuit diagram showing that the first masking switch and the second masking switch are connected to the uppermost bits of a level shifter according to one or more embodiments of the present disclosure.

Referring to FIG. 15, the first value Q and the second value QB of the third level shifter LS_D2 are connected to the masking switches SM1 and SM2, respectively. The first masking switch SM1 connected to the third level shifter LS_D2 is connected to D[2], and the second masking switch SM2 is connected to DB[2].

Since a short pass from the 3-bit global resistor string 441 is increased in the order of the first level shifter LS_D0, the second level shifter LS_D1, and the third level shifter LS_D2, signals at D[2] and DB[2] controlled by the first value Q and the second value QB of the third level shifter LS_D2 may be delayed. Therefore, when DB[2] may not momentarily be turned off, both D[2] and DB[2] are turned on to form a short pass, and to prevent such a malfunction, the first masking switch SM1 and the second masking switch SM2 may be simultaneously turned off to mask the outputs.

Figure 16:
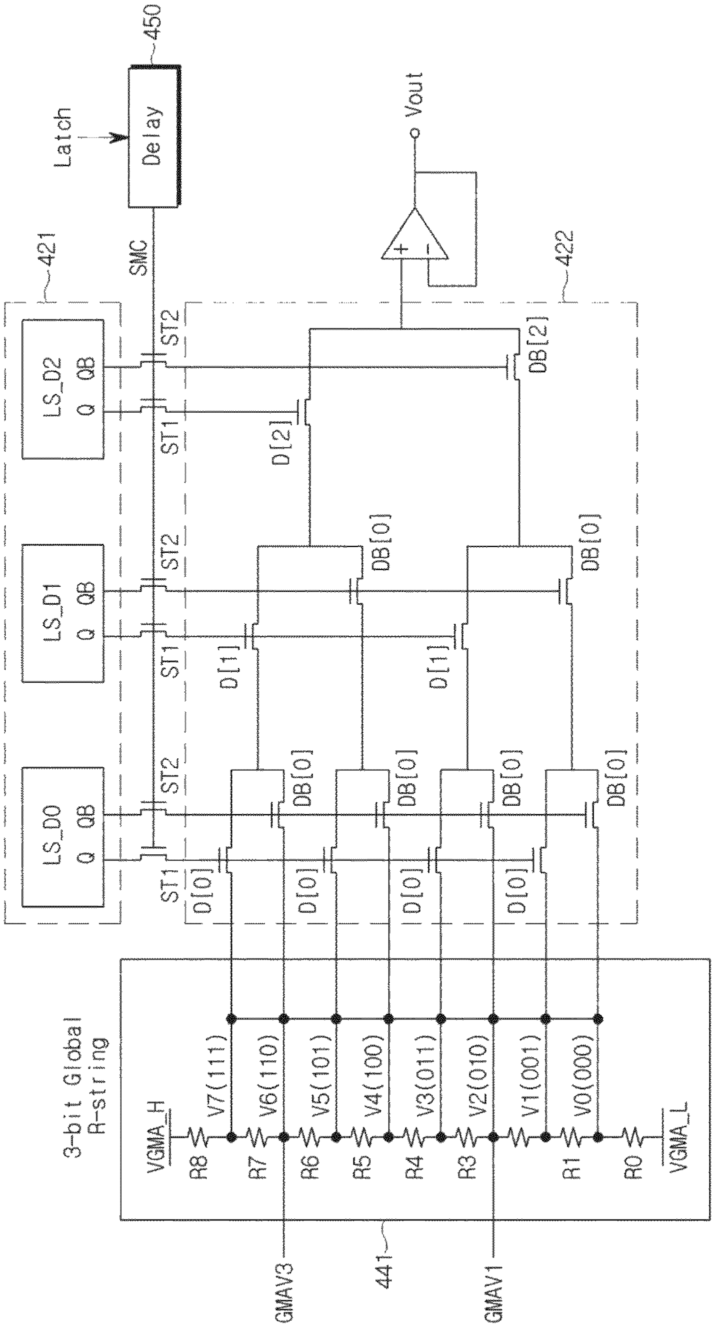
FIG. 16 is a circuit diagram showing that a delay unit is connected to control nodes of a first masking transistor and a second masking transistor according to one or more embodiments of the present disclosure.

FIG. 16 is a circuit diagram showing that a delay unit is connected to control nodes of a first masking transistor and a second masking transistor according to one or more embodiments of the present disclosure.

Referring to FIG. 16, a first masking transistor ST1 and a second masking transistor ST2 may receive the masking control signal SMC from the delay unit 450. However, the masking control signal SMC may be supplied from both the delay unit 450 and the timing controller 200, the data driver 400, and the latch unit 410. A latch start pulse Latch of the latch unit 410 may be connected to an input of the delay unit 450, but is not limited thereto.

Referring to FIG. 16, the first values Q and the second values QB of the first level shifter LS_D0, the second level shifter LS_D1, and the third level shifter LS_D2 are connected to the first masking transistor ST1 and the second masking transistor ST2, respectively. The first masking transistor ST1 connected to the first level shifter LS_D0 is connected to D[0], and the second masking transistor ST2 is connected to DB[0]. The first masking transistor ST1 connected to the second level shifter LS_D1 is connected to D[1], and the second masking transistor ST2 is connected to DB[1]. The first masking transistor ST1 connected to the third level shifter LS_D2 is connected to D[2], and the second masking transistor ST2 is connected to DB[2].

The delay unit 450 receives the latch start pulse Latch of the latch unit 410 and generates the masking control signal SMC. In other words, the latch start pulse Latch may control the start time point at which the data voltage of the latch unit 410 is supplied to the level shifter 421, and since a time point at which the output of the level shifter 421 is masked is a subsequent time point at which the analog voltage corresponding to the digital value of the image data Vdata is output to the buffer unit 430 according to the first value Q or the second value QB of the level shifter 421 from the switch array 422, there is a time interval and thus the latch start pulse Latch may be delayed to generate the masking control signal SMC.

Figure 17:
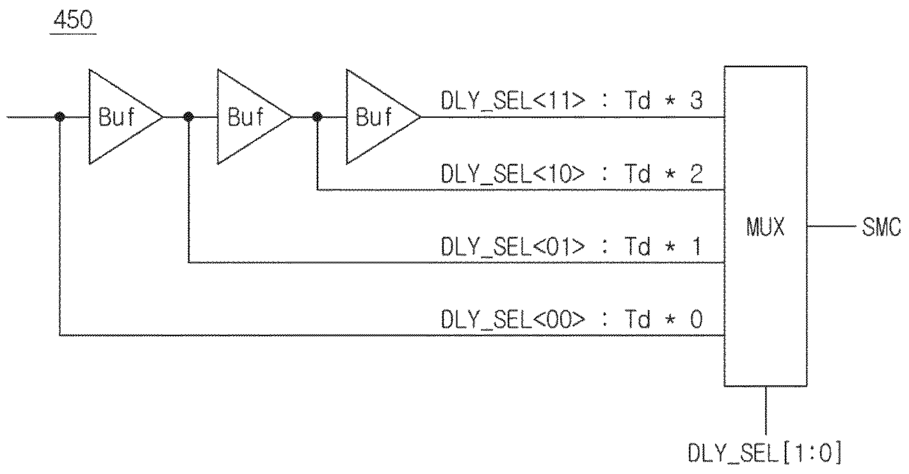
FIG. 17 is a circuit diagram showing that the delay unit includes a plurality of buffers and operates asynchronously according to one or more embodiments of the present disclosure.

FIG. 17 is a circuit diagram showing that the delay unit includes a plurality of buffers and operates asynchronously according to one or more embodiments of the present disclosure.

Referring to FIG. 17, the delay unit 450 may output a signal delayed by N times a time Td delayed by one buffer Buf into the masking control signal SMC by allowing the input signal to pass through N buffers Buf.

Figure 18:
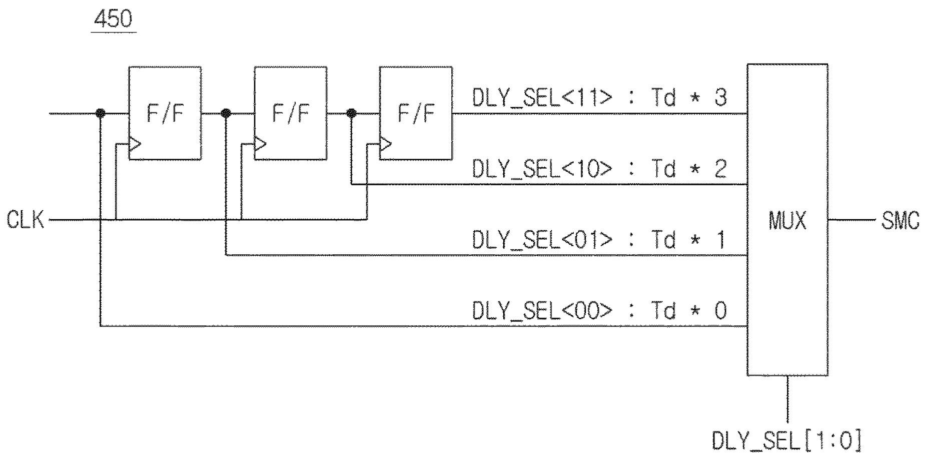
FIG. 18 is a circuit diagram showing that the delay unit includes a plurality of flip-flops and one clock and operates synchronously according to one or more embodiments of the present disclosure.

FIG. 18 is a circuit diagram showing that the delay unit includes a plurality of flip-flops and operates synchronously according to one or more embodiments of the present disclosure.

Referring to FIG. 18, the delay unit 450 may output a signal delayed by N times a time Td delayed by one flip-flop F/F into the masking control signal SMC by allowing the input signal to pass through N flip-flops F/F.

Figure 19:
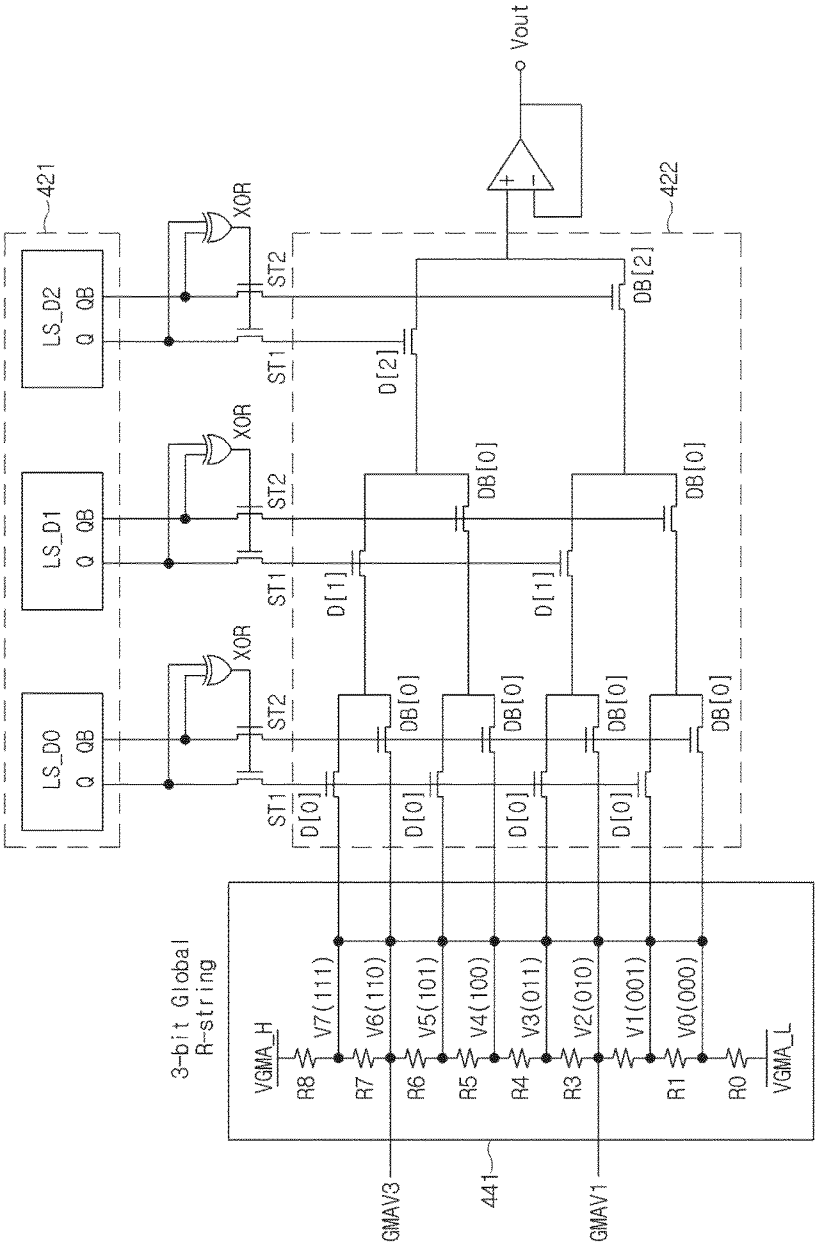
FIG. 19 is a circuit diagram showing that an XOR gate is connected to all bits of a level shifter according to one or more embodiments of the present disclosure.

FIG. 19 is a circuit diagram showing that an XOR gate is connected to all bits of a level shifter according to one or more embodiments of the present disclosure.

Referring to FIG. 19, the first values Q and the second values QB of the first level shifter LS_D0, the second level shifter LS_D1, and the third level shifter LS_D2 are each connected to the first masking transistor ST1 and the second masking transistor ST2. The first values Q and the second values QB of the first level shifter LS_D0, the second level shifter LS_D1, and the third level shifter LS_D2 may each be connected to an input of the XOR gate. An output of the XOR gate may be connected to the first masking transistor ST1 and the second masking transistor ST2.

The first masking transistor ST1 connected to the first level shifter LS_D0 is connected to D[0], and the second masking transistor ST2 is connected to DB[0]. The first masking transistor ST1 connected to the second level shifter LS_D1 is connected to D[1], and the second masking transistor ST2 is connected to DB[1]. The first masking transistor ST1 connected to the third level shifter LS_D2 is connected to D[2], and the second masking transistor ST2 is connected to DB [2].

The output of the XOR gate is turned on only when the first value Q and the second value QB are different and turned off when the first value Q and the second value QB are the same. Therefore, when the first values Q and the second values QB of the first level shifter LS_D0, the second level shifter LS_D1, and the third level shifter LS_D2 are the same, the output of the XOR gate is turned off to mask the outputs.

Figure 20:
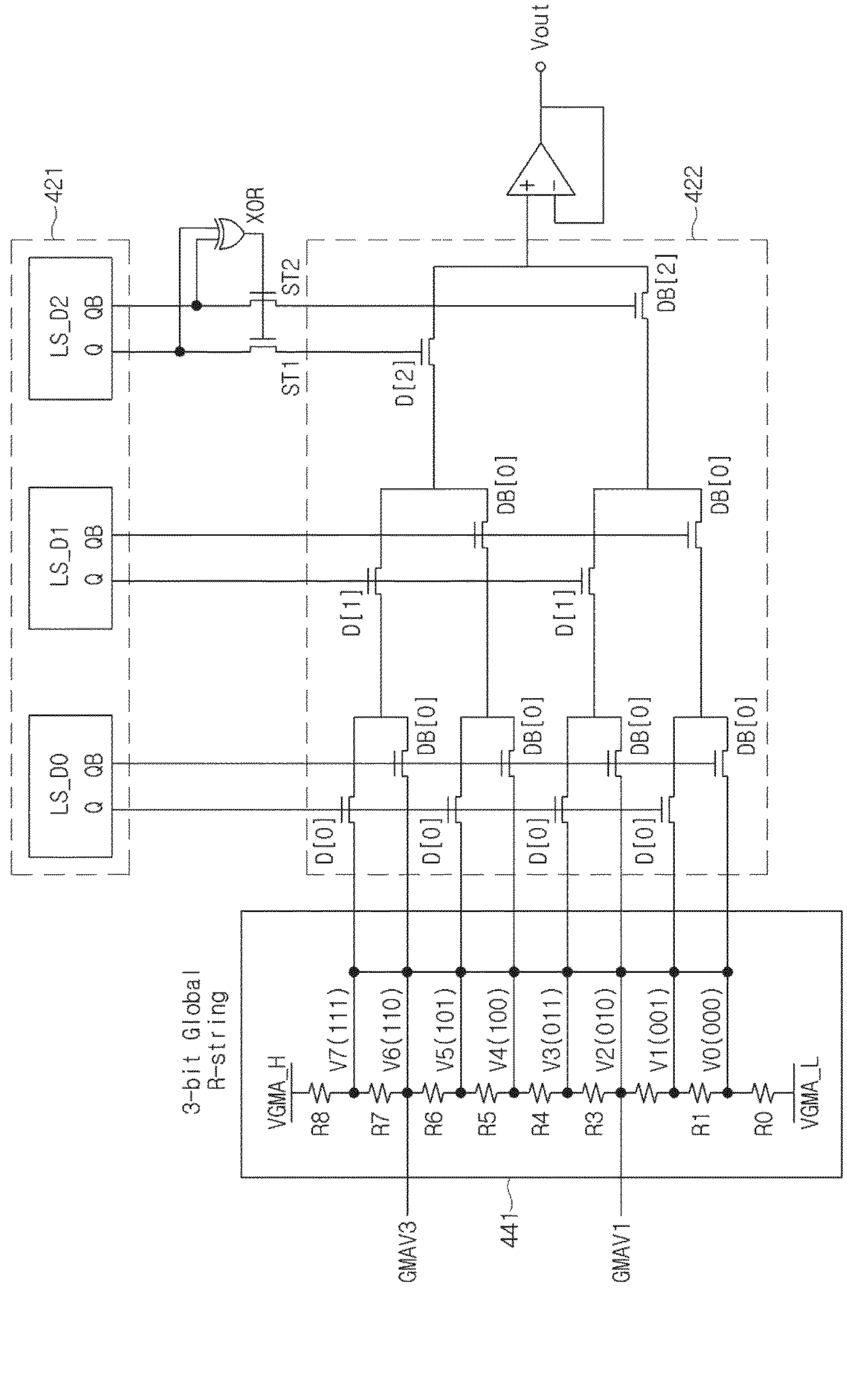
FIG. 20 is a circuit diagram showing that an XOR gate is connected to uppermost bits of a level shifter according to one or more embodiments of the present disclosure.

FIG. 20 is a circuit diagram showing that an XOR gate is connected to uppermost bits of a level shifter according to one or more embodiments of the present disclosure.

Referring to FIG. 20, the first value Q and the second value QB of the third level shifter LS_D2 are connected to the masking switches ST1 and ST2, respectively. The first value Q and the second value QB of the third level shifter LS_D2 may each be connected to the input of the XOR gate. An output of the XOR gate may be connected to the first masking transistor ST1 and the second masking transistor ST2.

The first masking transistor ST1 connected to the third level shifter LS_D2 is connected to D[2], and the second masking transistor ST2 is connected to DB[2].

The output of the XOR gate is turned on only when the first value Q and the second value QB are different and turned off when the first value Q and the second value QB are the same. Therefore, when the first value Q and the second value QB of the third level shifter LS_D2 are the same, the output of the XOR gate is turned off to mask the outputs.

Since a short pass from the 3-bit global resistor string 441 is increased in the order of the first level shifter LS_D0, the second level shifter LS_D1, and the third level shifter LS_D2, signals at D[2] and DB[2] controlled by the first value Q and the second value QB of the third level shifter LS_D2 may be delayed. Therefore, when DB[2] may not momentarily be turned off, both D[2] and DB[2] are turned on to form a short pass, and to prevent such a malfunction, the first masking transistor ST1 and the second masking transistor ST2 may be simultaneously turned off to mask the outputs.

FIG. 21 is a view showing turn-on or turn-off operations of the first masking transistor ST1 and the second masking transistor ST2 according to an operation of the XOR gate according to one or more embodiments of the present disclosure.

Referring to FIG. 21, the first values Q and the second values QB of the first level shifter LS_D0, the second level shifter LS_D1, and the third level shifter LS_D2 are all equal to each other as logic low (0) or logic high (1), the output of the XOR gate is logic low (0), and the first masking transistor ST1 and the second masking transistor ST2 are turned off. The first values Q and the second values QB of the first level shifter LS_D0, the second level shifter LS_D1, and the third level shifter LS_D2 all differ from each other as logic low (0) or logic high (1), the output of the XOR gate is logic high (1), and the first masking transistor ST1 and the second masking transistor ST2 are turned on.

The display device according to the embodiments may control the output by arranging a masking switch or an XOR gate between the level shifter and the switch array of the data driver, thereby minimizing the degradation of the image quality of the display device.

The above description and the accompanying drawings are merely illustrative of the technical spirit of the present disclosure, and those skilled in the art to which the present disclosure pertains can perform various changes or modifications, such as coupling, separation, substitution, and change of components, without departing from the essential characteristics of the present disclosure. Therefore, the embodiments disclosed herein are not intended to limit the technical spirit of the present disclosure, but to describe the same, and the scope of the technical spirit of the present disclosure is not limited by these embodiments. The scope of the present disclosure should be construed according to the appended claims, and all technical spirits within the equivalent range should be construed as being included in the scope of the present disclosure.

What is claimed is:

1. A display device, comprising:
- a timing controller configured to output image data;
- a display panel including a plurality of pixels, and a plurality of data lines connected to the plurality of pixels; and
- a data driver configured to generate a data voltage based on the image data, and apply the data voltage to a data line of the plurality of data lines, the data driver including:
  - a level shifter configured to receive the image data;
  - a switch array configured to generate the data voltage from the image data;
  - a masking switch between the level shifter and the switch array; and
  - an output buffer configured to output the data voltage from the data line.

2. The display device of claim 1, wherein an output of the output buffer is stopped when the masking switch is turned off.

3. The display device of claim 2, wherein the masking switch is connected to each of a plurality of level shifters.

4. The display device of claim 2, wherein the masking switch is connected to an uppermost level shifter among a plurality of level shifters.

5. The display device of claim 1, wherein the data driver further includes a delay unit connected to a control node of the masking switch.

6. The display device of claim 5, wherein the delay unit includes a plurality of buffers.

7. The display device of claim 6, wherein the delay unit operates asynchronously.

8. The display device of claim 7, wherein the delay unit includes a plurality of flip-flops.

9. The display device of claim 8, wherein the delay unit operates synchronously, and the delay unit includes one clock.

10. The display device of claim 1, wherein the data driver further includes a latch configured to maintain the image data as per-frame image data on at least one channel unit basis and provide the image data to the level shifter.

11. The display device of claim 10, wherein the latch operates in synchronization with a latch start pulse that controls a start time point at which the data voltage is supplied to the level shifter.

12. The display device of claim 11, wherein the data driver further includes a delay unit connected to a control node of the masking switch.

13. The display device of claim 12, wherein the latch start pulse is supplied to an input of the delay unit.

14. The display device of claim 1, further comprising:
- a gamma driver configured to generate gamma reference voltages based on a gamma control signal generated by the timing controller,
- wherein the data driver further includes a plurality of resistor strings configured to output a plurality of analog voltages to the level shifter based on the gamma reference voltages.

* * * * *